(12) United States Patent
Safaee et al.

(10) Patent No.: US 12,212,159 B1
(45) Date of Patent: Jan. 28, 2025

(54) LOSS-SPLIT MODELING FOR WIRELESS POWER TRANSFER

(71) Applicant: Apple Inc., Cupertino, CA (US)

(72) Inventors: Alireza Safaee, Cupertino, CA (US); Matthew J. Chabalko, Salinas, CA (US); Douglas Adams, Mountain View, CA (US); Ruiyang Lin, Milpitas, CA (US); Zaki Moussaoui, Micco, FL (US)

(73) Assignee: Apple Inc., Cupertino, CA (US)

( * ) Notice: Subject to any disclaimer, the term of this patent is extended or adjusted under 35 U.S.C. 154(b) by 62 days.

(21) Appl. No.: 18/330,043

(22) Filed: Jun. 6, 2023

Related U.S. Application Data

(63) Continuation of application No. 17/000,767, filed on Aug. 24, 2020, now Pat. No. 11,811,242, which is a continuation of application No. 16/939,182, filed on Jul. 27, 2020, now abandoned.

(60) Provisional application No. 62/901,039, filed on Sep. 16, 2019.

(51) Int. Cl.
*H02J 50/60* (2016.01)
*H02J 50/00* (2016.01)

(52) U.S. Cl.
CPC ............ *H02J 50/60* (2016.02); *H02J 50/005* (2020.01)

(58) Field of Classification Search
None
See application file for complete search history.

(56) References Cited

U.S. PATENT DOCUMENTS

| | | | | |
|---|---|---|---|---|
| 8,620,484 | B2* | 12/2013 | Baarman | H02J 50/60 363/16 |
| 8,634,928 | B1 | 1/2014 | O-Driscoll et al. | |
| 2011/0084752 | A1* | 4/2011 | Julstrom | H02J 7/0044 327/336 |
| 2013/0082538 | A1* | 4/2013 | Wambsganss | H02J 50/12 307/104 |
| 2015/0349538 | A1 | 12/2015 | Agostinelli et al. | |
| 2016/0309418 | A1 | 10/2016 | Sedzin et al. | |
| 2017/0040843 | A1 | 2/2017 | Asanuma et al. | |
| 2020/0169123 | A1 | 5/2020 | Mehas et al. | |

* cited by examiner

*Primary Examiner* — Jared Fureman
*Assistant Examiner* — Joel Barnett
(74) *Attorney, Agent, or Firm* — FLETCHER YODER PC

(57) ABSTRACT

A method of modeling a wireless power transfer system can include constructing a loss-split circuit model of the wireless power transfer system. The loss-split circuit model can include a plurality of resistance values corresponding to power losses in selected components of the power system. The method can further include performing a plurality of finite element analyses to determine the plurality of resistor values. The one or more resistance values can correspond to power losses associated with one or more of: a transmitter coil, a receiver coil, friendly metal associated with a transmitter, friendly metal associated with a receiver, and a foreign object.

24 Claims, 7 Drawing Sheets

LOSS-SPLIT MODELING FOR WIRELESS POWER TRANSFER

CROSS-REFERENCE TO RELATED APPLICATIONS

This application is a continuation of U.S. patent application Ser. No. 17/000,767, filed Aug. 24, 2020; which is a continuation of U.S. patent application Ser. No. 16/939,182 filed Jul. 27, 2020; which claims priority to and benefit of U.S. Provisional Application No. 62/901,039, filed Sep. 16, 2019, all of which are entitled "LOSS-SPLIT MODELING FOR WIRELESS POWER TRANSFER," which are incorporated herein by reference in their entirety for all purposes.

BACKGROUND

Wireless power transfer systems, also known as inductive power transfer systems, are becoming increasingly common in consumer applications. For example, many smartphones and associated accessories include wireless charging capabilities. An issue that can arise when wireless power transfer systems are used is a foreign object located in proximity to the wireless power transmitter and/or receiver. The magnetic fields used to transfer power from the transmitter to the receiver may also induce currents in the foreign object. This can lead to both power losses and undesirable heating of the foreign object.

To mitigate these and other issues relating to wireless power transfer, and to provide for uniformity and interoperability between wireless power transfer devices from different manufacturers, the Wireless Power Consortium (made up of various industry participants) has promulgated a series of standards (referred to as "Qi") that define certain aspects of wireless power transfer systems used for charging batteries in consumer devices. One aspect of these standards requires that in at least some implementations the wireless power receiver report to the wireless power transmitter how much power was received and delivered on the receiver side so that the transmitter can detect power losses associated with a foreign object and take remedial action as indicated.

While seemingly simple, these power accounting techniques, which are used to limit power that can be delivered to a foreign object, are actually quite complex. More specifically, it is difficult to simulate a power-accounting system, as it traditionally requires many very slow interlinked FEA and spice simulations that span the operating space of the wireless power transfer system. Thus, what is needed in the art is an analysis framework and corresponding model that provides independent estimates of losses induced in the transmitter, receiver, and a foreign object (if present), while decoupling the Finite Element Analysis (FEA) and spice simulations to drastically reduce simulation time.

SUMMARY

A method of modeling a wireless power transfer system can include constructing a loss-split circuit model of the wireless power transfer system. The loss-split circuit model can include a plurality of resistance values corresponding to power losses in selected components of the power system. The method can further include performing a plurality of finite element analyses to determine the plurality of resistor values. The one or more resistance values can correspond to power losses associated with one or more of: a transmitter coil, a receiver coil, friendly metal associated with a transmitter, friendly metal associated with a receiver, a foreign object, as well as any subdivision or combination thereof. Friendly metal associated with a transmitter can include metal in the transmitter housing, circuit boards, display, battery, and any internal or external components. Friendly metal associated with a receiver can include metal in the receiver housing, circuit boards, and any internal or external components. The loss-split circuit model may be a modified T-model. The plurality of finite element analyses can include a plurality of orthogonal analyses in which current values are set for a transmitter side and a receiver side of the modeled wireless power transfer system.

The method of modeling a wireless power transfer system can further include performing circuit simulations using the derived values for the plurality of resistance values at a plurality of electrical operating points. Additionally, the method elements of constructing a loss-split circuit model, performing a plurality of finite element analyses, and performing the circuit simulations may be performed for a plurality of physical operating points.

A wireless power transmitter can include one or more transmitter coils, wireless power transmitting circuitry configured to drive the one or more transmitter coils with energy derived from a power source, and control circuitry configured to control the wireless power transmitting circuitry. The control circuitry may include foreign object detection algorithms derived from a loss-split circuit model. The foreign object detection algorithms may include coefficients derived according to the methods described herein. Additionally, the wireless power transmitter may have a housing designed in accordance with the methods described herein.

A wireless power receiver can include one or more receiver coils, wireless power receiving circuitry configured recover power from the one or more receiver coils, and control circuitry configured to control the wireless power receiver circuitry. The control circuitry may include foreign object detection algorithms derived from a loss-split circuit model. The foreign object detection algorithms may include coefficients derived according to the methods described herein. Additionally, the wireless power receiver may have a housing designed in accordance with the methods described herein.

DETAILED DESCRIPTION

Figure 1:
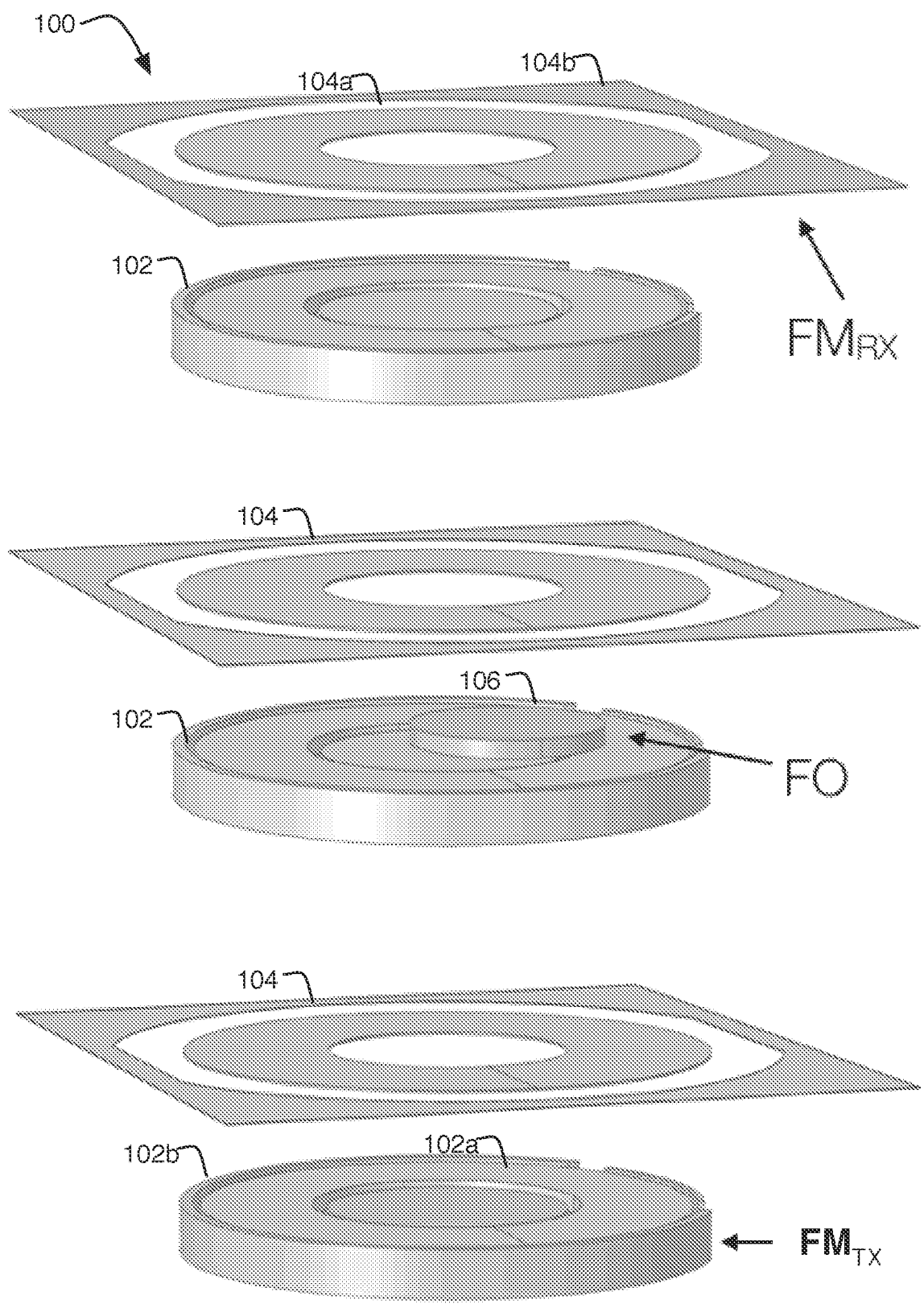
FIG. 1 illustrates a wireless power transfer system.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, and has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one." or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates, at a high level, various regions of a wireless power transfer system 100. Wireless power transfer system 100 may include a wireless power transmitter (TX) 102 and a wireless power receiver (RX) 104. For purposes of power accounting, wireless power transmitter 102 may be thought of as having two components, the transmitter coil 102a and the "transmitter friendly metal" (FMTx) 102b. Wireless transmitter coil 102a may be the windings used for wireless power transfer, and may also be referred to as "the copper" (because such windings are often made of copper or a copper alloy), "the windings," or words of similar import. Transmitter friendly metal 102b may include various metallic components of the transmitter, which have been accounted for by the designers of the transmitter and which are not expected to interfere with operation of the wireless power transfer system as a "foreign object."

Further, for power accounting purposes, wireless power receiver 104 may be thought of as having two components, the receiver coil 104a and the "receiver friendly metal" ($FM_{RX}$) 104b. As with the transmitter, wireless receiver coil 104a may be the windings used for wireless power transfer, and may also be referred to as "the copper" (because such windings are often made of copper or a copper alloy), "the windings," or words of similar import. Receiver friendly metal 104b may include various metallic components of the receiving device, which have been accounted for by the designers of the receiver and which are not expected to interfere with operation of the wireless power transfer system as a "foreign object."

Finally, when undertaking wireless power transfer power accounting analysis, foreign objects "FO" 106 may also be considered. In general, a foreign object may be any metallic body other than transmitter coil 102a, transmitter friendly metal 102b, receiver coil 104a, and receiver friendly metal 104a that interacts with the magnetic fields associated with the wireless power transfer operation. Those magnetic fields may induce currents in the foreign object, which is an undesirable mode of operation. First, such currents lead to losses in the power transmitted from the transmitter to the receiver, which can have undesirable effects on operations performed by the receiver, such as increasing battery charging time, limiting the ability to operate at certain power levels, etc. Additionally, the power dissipated in the foreign object by these induced currents can lead to heating of the foreign object. As part of the operation of a wireless power transfer system, estimation of the power being lost to foreign objects may be used to determine whether the wireless power transfer system should take remedial actions, such as reducing transmitter power to reduce foreign object losses, or shutting down as appropriate.

Estimation of the power being lost to the foreign objects relies on a process called power accounting. At a high level, this power accounting is relatively straightforward. For example, the wireless power transmitter will know, at any point in time, how much power is being transmitted by transmitter coil 102a. The wireless power receiver can determine, at any point in time, how much power it is receiving at receiver coil 102b. Transmitter 102 and receiver 104, may be configured by their respective manufacturers to know or approximate how much power is being lost to the friendly metal associated with that device for a given transmitted or received power level at the coils. This may be based on analysis and/or experimentation performed as part of the design process, and may be developed using the methods illustrated in FIG. 2. The transmitter and receiver may communicate with each other, and by subtracting the transmitted power from the received power, and accounting for the estimated losses associated with the friendly metal, the power lost to a foreign object may be inferred. Often this may be performed by the transmitter, although there is no physical reason that the receiver could not be the one to perform the accounting. In either case, one or the other (or both) of the transmitter and receiver may take remedial action if the inferred foreign object losses are deemed too high.

Figures 2A, 2B:
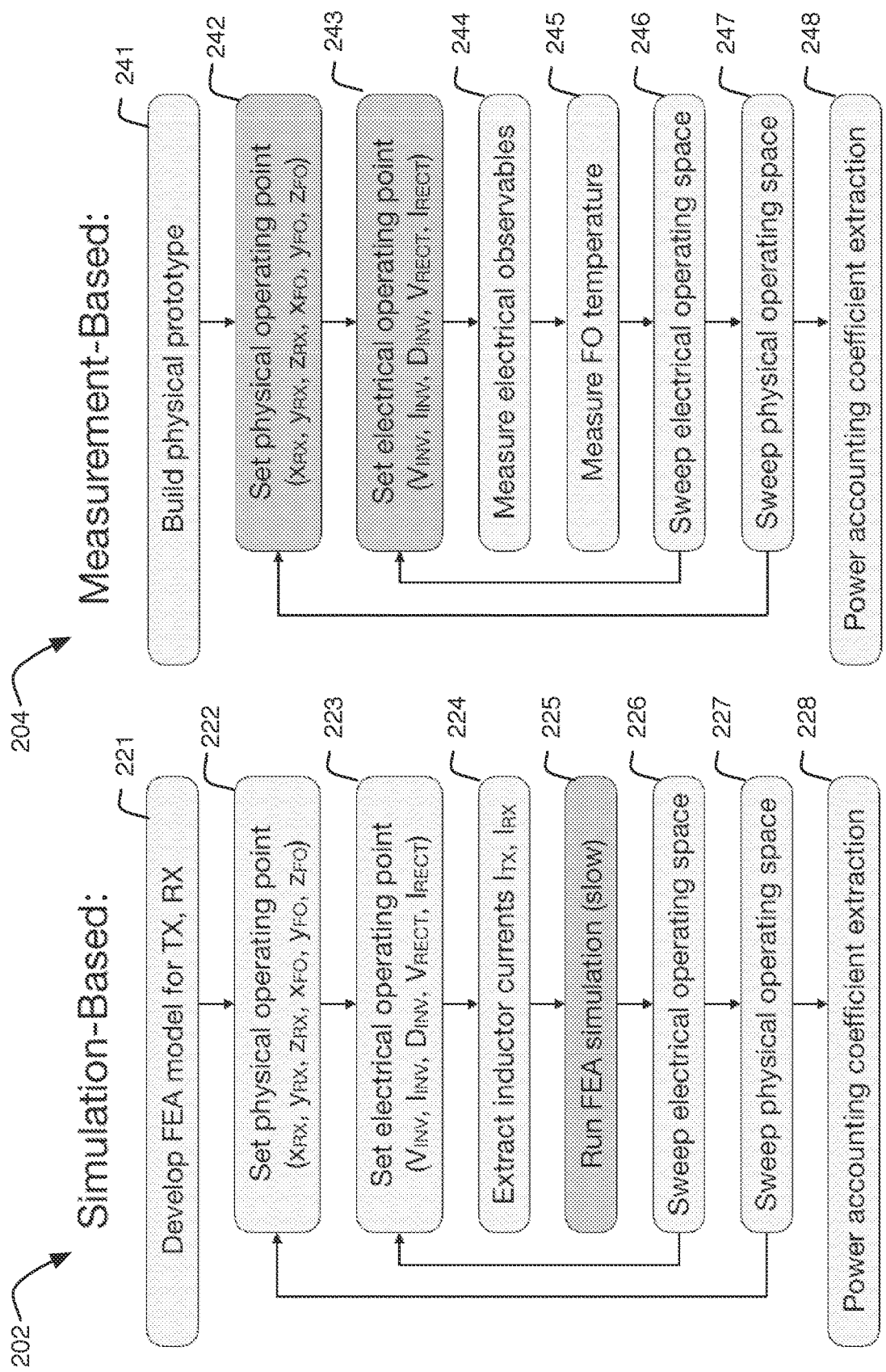
FIGS. 2A and 2B illustrate methods for extracting the coefficients for a power accounting system.

As noted above, both transmitter 102 and receiver 104 may be configured to estimate or approximate the losses associated with their friendly metal components and foreign objects. Historically this has been done by the devices having lookup tables or formulas programmed therein that are based on a series of power accounting coefficients that are derived from simulation and/or measurement performed during the design of the device. FIG. 2A illustrates a flow chart of an exemplary method for simulation-based extraction of power accounting coefficients. Simulation-based method 202 begins at block 221 with developing a finite element analysis (FEA) model for transmitter, receiver, and exemplary foreign objects. This FEA model may include the physical configuration and composition of structural components of the transmitter and/or receiver and/or foreign object(s). As discussed in greater detail below, this FEA model may be used to calculate power losses in the transmitter, receiver and any foreign object(s) for a given operating point.

Once the FEA model is developed (block 221), a physical operation point may be determined at block 222. This physical operation point includes the positions of the receiver (xRX, yRX, zRX) and any foreign object (xFO, yFO, zFO) relative to the transmitter. Developing a robust power accounting model, i.e., coefficients that are accurate for many possible configurations will require iterating through a series of physical operation points representative of a wide variety of physical configurations that could be expected in operation.

Once the physical operation point is determined (block 222), an electrical operating point may also be determined (223). An electrical operating point may include—from the transmitter side—an inverter voltage VINV, and inverter current IINV, and an inverter duty cycle DINV. (In the transmitter, an inverter may be used to generate an AC signal that stimulates the transmitter coil.) The electrical operation point may also include—from the receiver side—the rectifier voltage and the rectifier current. (In the receiver, a rectifier may be used to rectify the AC signal induced in the receiver coil by the transmitter coil into a DC voltage used by devices powered by the receiver.)

Once the electrical operating point is determined (block 223), the transmitter coil current ITX and receiver coil current IRX may be determined in block 224. This determination may be made using relatively straightforward circuit analysis techniques, including circuit simulators such as SPICE and the like. Once the coil currents are determined (block 224), the FEA simulation may be performed to model the losses in the transmitter, receiver, and/or foreign object (s). Because of the nature of FEA simulations this step necessarily takes a relatively long time, even on relatively powerful computers. Additionally, extracting a robust set of power accounting coefficients (block 228) can require that both the circuit analysis in block 224 and FEA simulation in block 225 be performed for a wide variety of electrical operating points (i.e., iterating through different electrical conditions block 226) as well as physical operating points (i.e., iterating through physical configurations of transmitter, receiver, and/or foreign object in block 227). In many applications this can lead to an unmanageably large computation requirement. In practice, many implementations will reduce the number of operating points selected to provide a manageable level computation. As a result, the power accounting coefficients extracted by block 228 may be less robust than would otherwise be preferred.

As an alternative to the simulation-based technique 202, a measurement-based technique 204 may be employed as illustrated in FIG. 2B. Measurement-based technique 204 may begin with building a physical prototype of the transmitter and/or receiver (block 241). Once the prototype is built a physical operating point (i.e., relative positioning of transmitter, receiver, and/or foreign object) may be established (block 242). Then an electrical operating point (inverter voltage, current, and duty cycle and rectifier voltage and current) may be established (block 243). At this point, the various electrical observables (voltage, current, and power dissipation among various components) may be measured (block 244). Additionally, the temperature of the experimentally placed foreign object may be measured (block 245). As with the simulation-based process 202, extracting a robust set of power accounting coefficients (block 248) requires sweeping through both the space of likely electrical operating points (246) and physical operating points (247). As a result, some form of automation for both the physical positioning and electrical settings/measurements is required, leading to increased costs. Additionally, these explicit measurement-based techniques may also be extremely time consuming as the number of operating points increases, and do not readily lend themselves to accounting for unit-to-unit variation-once again potentially leading to less-robust power accounting coefficients.

Figure 3:
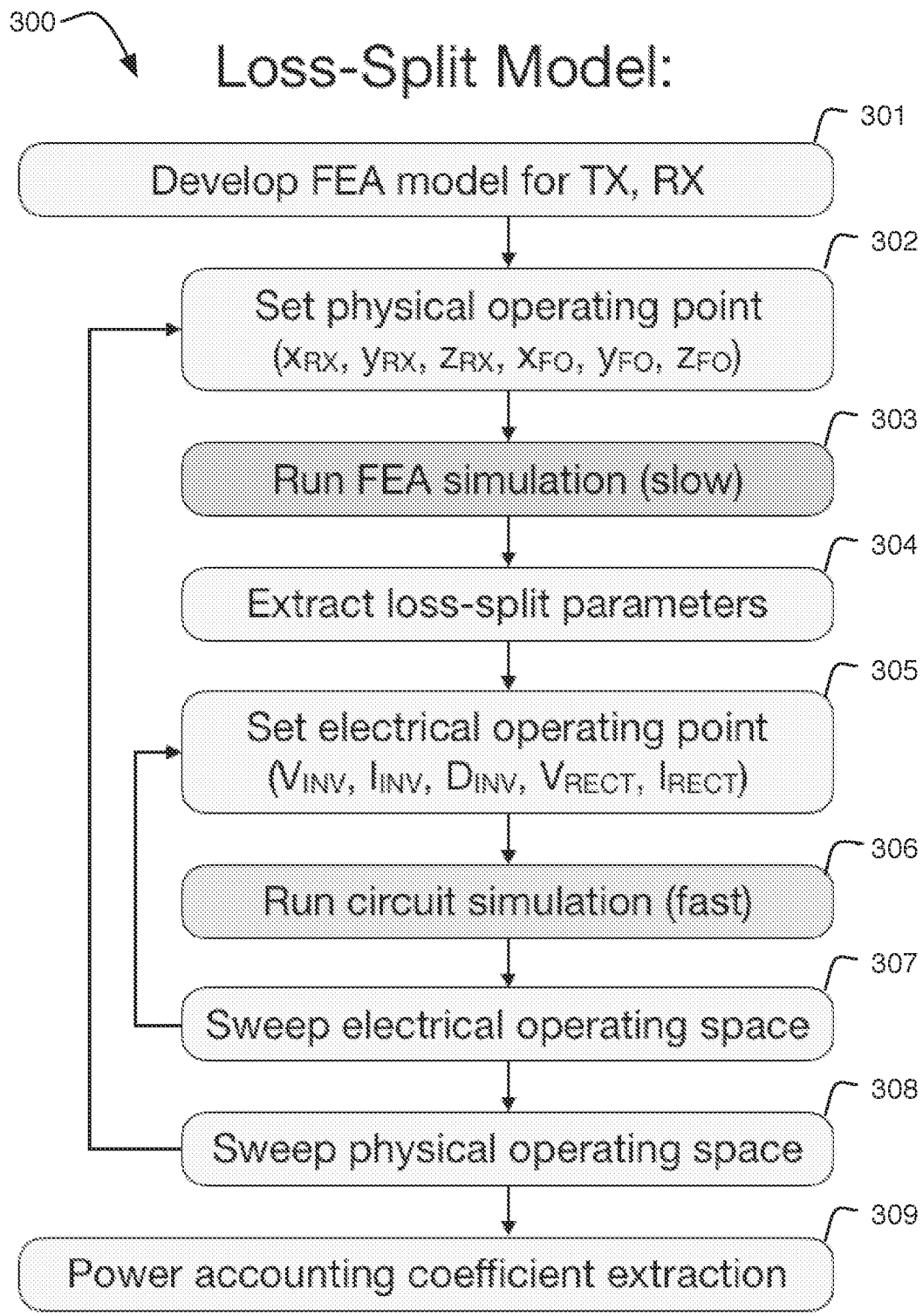
FIG. 3 illustrates an improved method for extracting the coefficients for a power accounting system.

FIG. 3 illustrates an alternative power accounting coefficient extraction method 300 employing a loss-split model. The loss-split model is described in greater detail below. The loss-split based method may include developing a FEA model (block 301) for the transmitter, receiver, and/or foreign object(s) as with the simulation-based method 220 discussed above with respect to FIG. 2A. Then, a physical operating point (i.e., relative positions of transmitter, receiver, and/or foreign object(s) may be determined (block 302). In distinction to method 220, the computationally extensive FEA simulation may be performed at this point (block 303). As explained in greater detail below, the loss-split parameters may be extracted from this FEA simulation (block 304) based on a physical operating point (which are universal, i.e., valid for all electrical operating points).

Once the loss-split parameters are determined (block 304), an electrical operating point (for example including inverter voltage, current, and duty cycle and rectifier voltage and current) may be determined (block 305). This electrical operating point may be used to run a circuit simulation to determine power dissipation in the various components of the loss-split model (as determined in greater detail below). As with the other methods discussed above, circuit simulation using the loss-split models may be made for the entire relevant electrical operating space (block 307), and FEA simulations may be performed for the entire relevant physical operating space block 309. Once the computations are performed, power accounting coefficients may be extracted from the data. It will be appreciated that the loss-split based method of FIG. 3 requires only one FEA simulation for each physical operating point, rather than one FEA simulation for each electrical operating point at each physical operating point, which can substantially reduce the number of computationally intensive FEA simulations required, thereby expediting the process of extracting power accounting coefficients.

Figure 4:
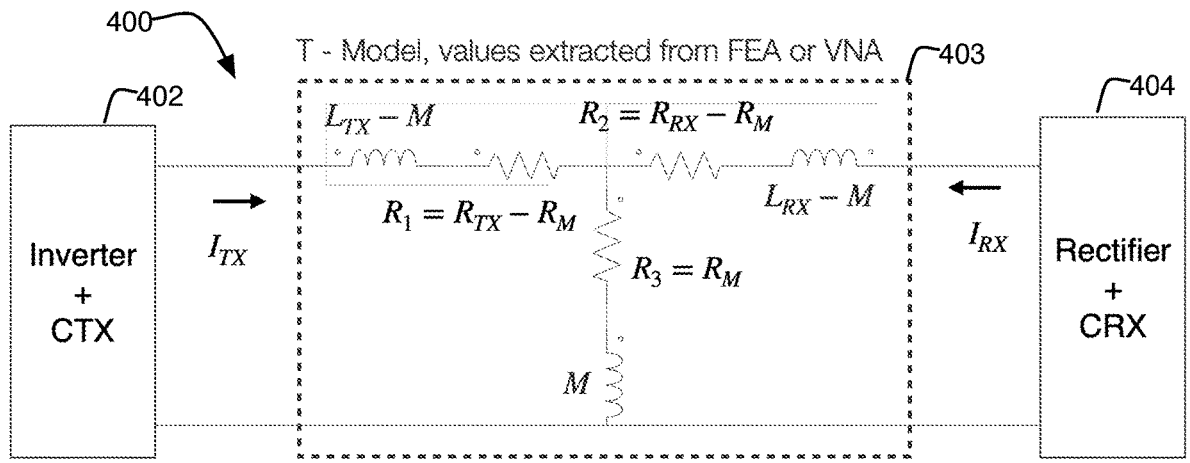
FIG. 4 illustrates a circuit model of a wireless power transfer system.

FIG. 4 illustrates an electrical model of a wireless power transfer system 400. Wireless power transfer system 400 may include a transmitter side 402 that may include an inverter. Wireless power transfer system 400 may further include a receiver side 404 that may include a rectifier. Coupling transmitter side 402 to receiver side 404 is a T-model 403 representing the electromagnetic interactions of the system and describes the behavior of the coupled transmitter and receiver coils. At a high level, the electromagnetic interaction between the transmitter coil and the receiver coil may be thought of as an air core transformer. A T-model is a method of modeling a transformer circuit element. The resistors and inductors that make up T-model 403 are not physical components that can individually be located in a particular embodiment, but rather are mathematical representations that together describe the two-port behavior of the wireless power transmission system components.

More specifically, T-model 403 includes resistor R3/RM and inductor M in the base of the T. Inductor M represents the magnetizing inductance of the equivalent wireless power transformer, while resistor R3 (or RM) represents the losses associated with the magnetizing current. The left/transmitter/primary side of the T-model includes an inductance LTX-M and a resistor R1=RTX-RM. The inductance represents the inductance of the transmitter/primary side, less the magnetizing inductance, which generally corresponds to the leakage inductance of the transmitter/primary side. Resistor R1 similarly represents the losses seen by the primary side less the magnetizing losses. The right/receiver/secondary side of the T-model includes an inductance LRX-M and a resistor R2=RRX-RM. The inductance represents the inductance of the transmitter/secondary side, less the magnetizing inductance, which generally corresponds to the leakage inductance of the receiver/secondary side. Resistor R1 similarly represents the losses seen by the secondary side less the magnetizing losses. In the case of a foreign object, the series inductors and resistors will also include values corresponding to the magnetizing and resistive losses associated with the foreign object. As alluded to above, the T-model for a given implementation may be derived from finite element analysis (as in method 220) or from measurements of a prototype (as in method 240).

Figure 5:
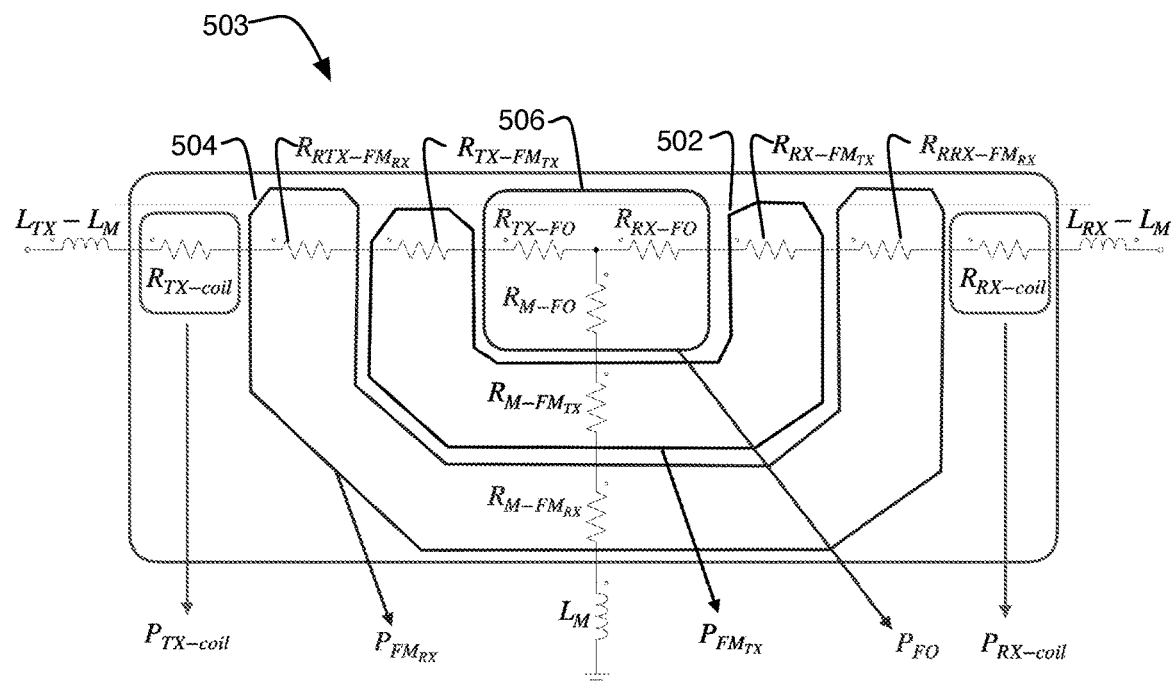
FIG. 5 illustrates a loss-split based model of the inductive link in a wireless power transfer system.

FIG. 5 illustrates a loss-split model 503 that may be advantageously employed in place of the T-model of FIG. 4. Loss-split model splits the resistances of the T-model into individual resistances corresponding to the losses in various components of the wireless power transfer system. For example, the left/transmitter/primary resistance R1 may be split into four resistance values RTX-coil, RRTX-FMRX, RTX-FMTX, and RTX-FO. The right/receiver/secondary resistance R2 may be split into four resistance values RRX-FO, RRX-FMTX, RRX-FMRX, and RRX-coil. Finally, T-base resistance R3 may be split into RM-FO, RM-FMTX, and RM-FMRX.

Again, the individual resistors themselves are not physical components of the circuit, but rather a mathematical/circuit model of the system. More specifically, resistors RTX-coil and RRX-coil may be used to represent losses experienced in the transmitter and receiver coils, respectively. Resistor group 502, made up of resistors RRTX-FMTX, RM-FMTX, and RRX-FMTX may be used to represent power dissipated in transmitter friendly metal 102b. Resistor group 504, made up of resistors RRTX-FMRX, RM-FMRX, and RRX-FMRX may be used to represent power dissipated in receiver friendly metal 104b. Resistor group 506, made up of resistors RTX-FO, RM-FO, and RRX-FO may be used to represent power dissipated in foreign object 106. As noted above with respect of FIG. 3, finite element analysis may be used determine the loss-split parameters given in FIG. 5.

Figure 6:
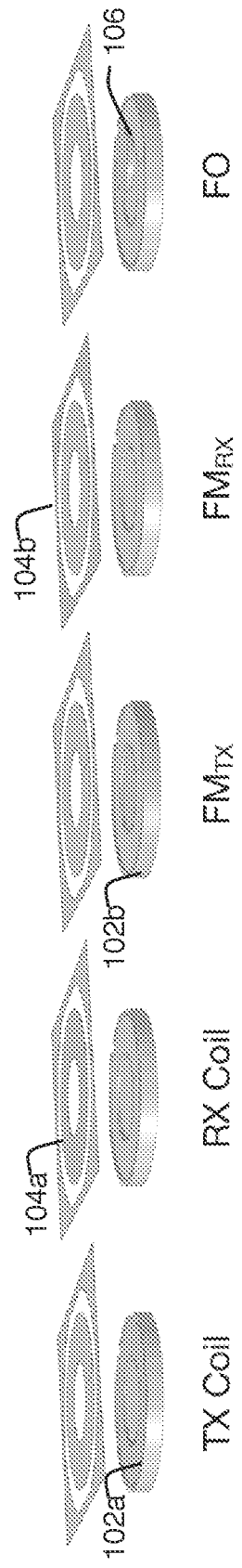
FIG. 6 illustrates a sequence of finite element analyses that may be performed to extract a loss-split model.

More specifically, FIG. 6 illustrates a sequence of finite element analyses that may be performed for three orthogonal cases of electrical operating conditions and five spatial components for each physical operating point. In each case, a fixed/known/predetermined current value may be considered as flowing in the transmitter and in the receiver. In each case, FEA may determine power losses in each of the five components for the specified currents. More specifically, using these set current values FEA may be used to determine losses in the transmitter coil 102a, the receiver coil 104a, the receiver coil 104a, the transmitter friendly metal 102b, the receiver friendly metal 104b, and a foreign object 106. Three or more orthogonal cases of electrical operating conditions may be used for the FEAs. In a first case, the transmitter may have a non-zero set/predetermined current, while the receiver has a zero set/predetermined current. In a second case, the transmitter may have a zero set/predetermined current, while the receiver has a non-zero set/predetermined current. In a third case, both the transmitter and receiver may have non-zero set/predetermined current with a specified phase shift between the two. These three cases give three orthogonal (i.e., linearly independent) sets of conditions that can be used as further described below to determine the resistances of the loss-split model.

Performing the FEAs described above will give a series of calculated power losses for each case that correspond to various resistances in the loss-split model of FIG. 5. Using the power dissipated equals current squared times resistance (i.e., P=I^2*R) formula, a series of equations can be derived from each FEA case. More specifically, for Case 1, in which the transmitter current has a predetermined value (e.g., 1 A) and the receiver current is fixed at zero, the following equations may be derived:

$$P_{TX\text{-}coil\text{-}case1}=I_{TX}^2 \cdot R_{TX\text{-}coil}$$

$$P_{FM_{TX}\text{-}case1}=I_{TX}^2 \cdot (R_{TX\text{-}FM_{TX}}+R_{M\text{-}FM_{TX}})$$

$$P_{FM_{RX}\text{-}case1}=I_{TX}^2 \cdot (R_{TX\text{-}FM_{RX}}+R_{M\text{-}FM_{RX}})$$

$$P_{FO\text{-}case1}=I_{TX}^2 \cdot (R_{TX\text{-}FO}+R_{M\text{-}FO})$$

For case 2, in which the transmitter current is fixed at zero and the receiver current has a predetermined value (e.g., 1 A), the following equations may be derived:

$$P_{RX\text{-}coil\text{-}case2}=I_{RX}^2 \cdot R_{RX\text{-}coil}$$

$$P_{FM_{TX}\text{-}case2}=I_{RX}^2 \cdot (R_{RX\text{-}FM_{TX}}+R_{M\text{-}FM_{TX}})$$

$$P_{FM_{RX}\text{-}case2}=I_{RX}^2 \cdot (R_{RX\text{-}FM_{RX}}+R_{M\text{-}FM_{RX}})$$

$$P_{FO\text{-}case2}=I_{RX}^2 \cdot (R_{RX\text{-}FO}+R_{M\text{-}FO})$$

Likewise, for case 3, in which the transmitter and receiver current have the same value (e.g., 1 A) and the currents are in phase (i.e., have a relative phase shift of zero), the following equations may be derived:

$$P_{FM_{TX}\text{-}case3}=I_{TX}^2 \cdot R_{TX\text{-}FM_{TX}}+I_{RX}^2 \cdot R_{RX\text{-}FM_{TX}}+(I_{TX}+I_{RX})^2 \cdot R_{M\text{-}FM_{TX}}$$

$$P_{FM_{RX}\text{-}case3}=I_{TX}^2 \cdot R_{TX\text{-}FM_{RX}}+I_{RX}^2 \cdot R_{RX\text{-}FM_{RX}}+(I_{TX}+I_{RX})^2 \cdot R_{M\text{-}FM_{RX}}$$

$$P_{RO\text{-}case3}=I_{TX}^2 \cdot R_{TX\text{-}FO}+I_{RX}^2 \cdot R_{RX\text{-}FO}+(I_{TX}+I_{RX})^2 \cdot R_{M\text{-}FO}$$

The net result of the three cases is system of eleven equations with eleven unknowns. More specifically, the respective resistance values are the unknowns, with the current values and powers dissipated being the parameters specified and calculated from the respective FEA runs. An algebraic solution for the split loss model resistances is thus a straightforward matter, and these resistances may be plugged into a circuit simulation model (as described above) as part of the power accounting coefficient extraction process.

Figure 7:
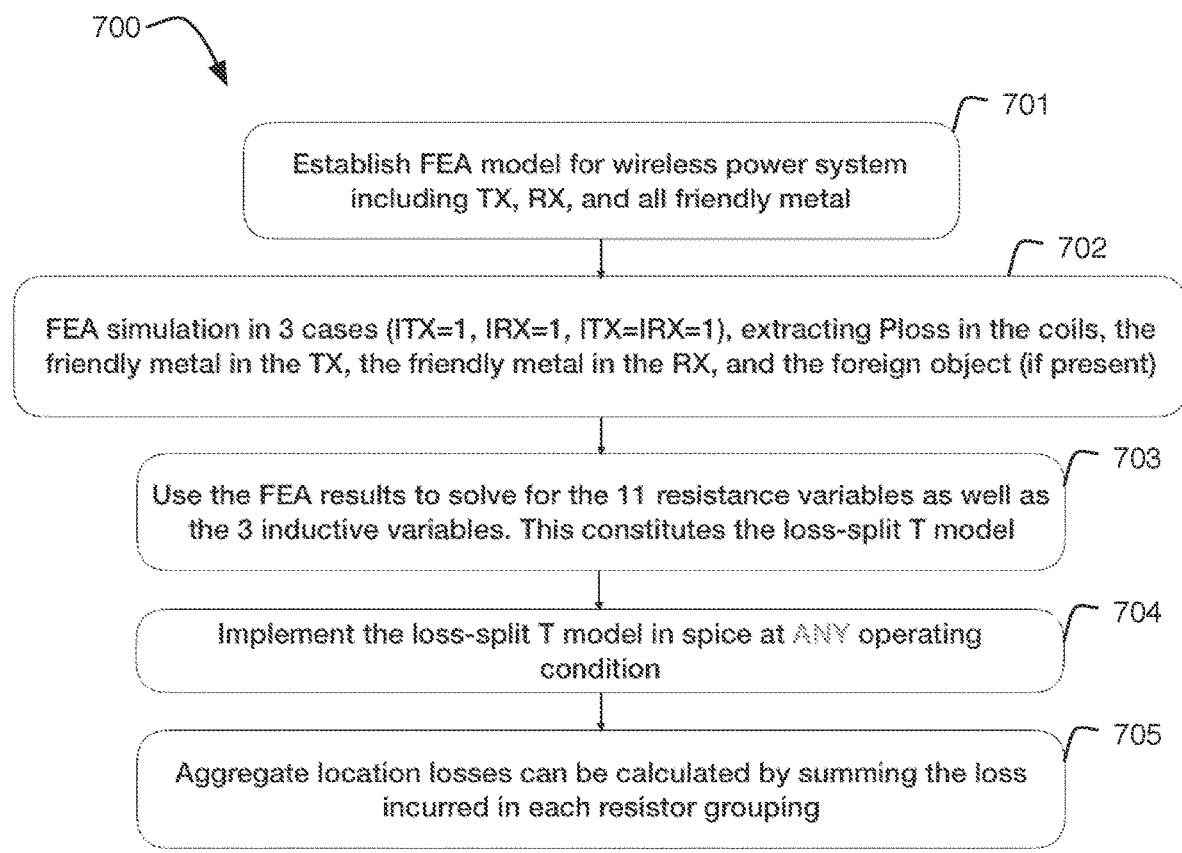
FIG. 7 illustrates a method of implementing a loss-split based model in simulation.

FIG. 7 illustrates a method 700 incorporating the analysis techniques described above. It will be appreciated that method 700 is generally similar to method 300 discussed above, but includes the additional context from the illustrated loss-split modeling discussed with reference to FIGS. 4-6, and does not describe the power accounting coefficient extraction. Method 700 begins with establishing a FEA model for the wireless power system (block 701). The FEA model may include the transmitter coil, the receiver coil, and all friendly metal. Optionally, the FEA model may also include foreign object(s). In block 702, FEA simulation is run for three orthogonal (linearly independent) cases (predetermined electrical conditions) to determine the power losses in each coil, in the friendly metal components, and the foreign object(s) if present. One exemplary set of three orthogonal/linearly independent cases include one case in which the transmitter current is set to a specified value (e.g., 1 A) with the receiver current set to zero, one case in which the receiver current is set to a specified value (e.g., 1 A) with the transmitter current set to zero, and one case in which the transmitter current and receiver currents are set to equal values (e.g., 1 A) and in phase. It will be appreciated that other orthogonal/linearly independent cases could also be used to produce additional granularity in the location of loss, although such other cases may result in more complicated systems of equations for solution in block 703.

In block 703, the FEA results obtained in block 702 are used to solve for the eleven resistance values (as well as the inductance values) of the loss-split model. These resistance and inductance values may then be fed into a circuit simulator (e.g., SPICE or similar) and used to calculate power losses in each component for any of a variety of electrical operating conditions (block 704). The aggregate losses for each physical component (i.e., coils, friendly metal, and foreign objects may be determined by summing the power dissipated in the model resistances corresponding to that component as discussed above with respect to FIG. 5.

As alluded to above, the power dissipation results derived from the circuit simulation steps 704 and 705 may be used to generate tables of power loss values corresponding to certain physical and electrical operating conditions. In some cases, it may be desirable to generate tables for a transmitter with a variety of receivers or vice versa. In some embodiments, these tables may be used by a transmitter or a receiver (or both) of a wireless power transfer system to detect a foreign object. For example, a component that knows (by measurement) its own coil power dissipation and (by communication) its counterpart's identity and coil power dissipation may be able to determine the associated friendly metal losses and detect a foreign object(s) if present. This analysis performance may be conducted with direct reference to the aforementioned tables stored in a memory of one or more of the respective devices, or, more likely, a series of regression analyses may be performed to arrive at regression coefficients (i.e., power accounting coefficients). These coefficients may be stored in a memory of the devices and a processor of the devices may perform calculations using these regression/power accounting coefficients to estimate the associated power dissipations for the friendly metal components, foreign objects, and even the physical configuration of the system.

Figure 8:
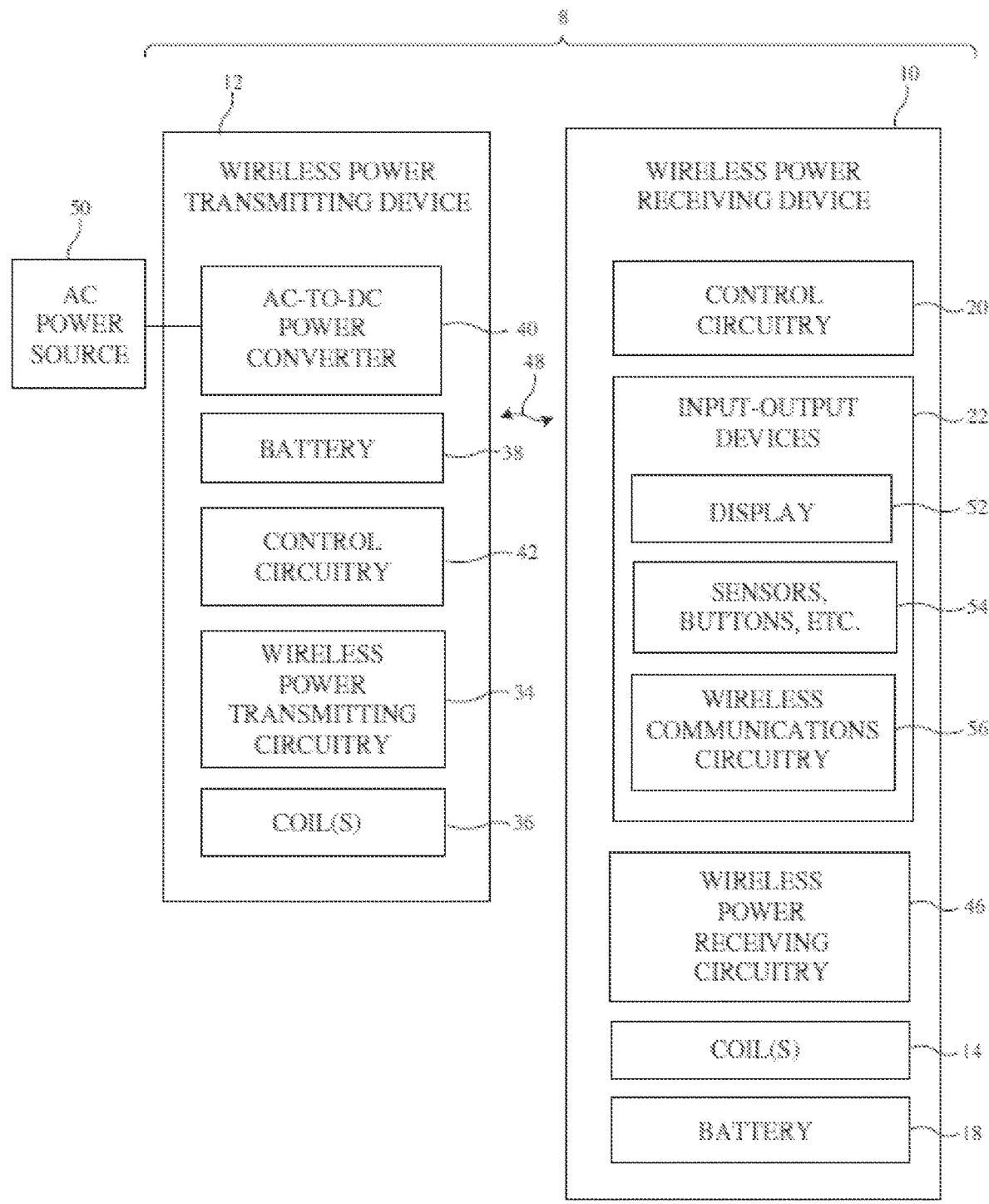
FIG. 8 is a schematic diagram of an illustrative wireless power system in accordance with some embodiments.

FIG. 8 illustrates an exemplary wireless power system that may incorporate the teachings described above. As shown in FIG. 8, a wireless power system 8 includes a wireless power transmitting device 12 (which may also be referred to in some instances as an inductive power transmitter) and one or more wireless power receiving devices such as wireless power receiving device 10 (which may also be referred to in some instances as an inductive power receiver). Device 12 may be a stand-alone device such as a wireless charging mat, may be built into furniture, laptop or tablet computers, cellular telephones or other electronic devices, or may be other wireless charging equipment. Device 10 is a portable electronic device such as a wristwatch, a cellular telephone, a tablet computer, an electronic pencil or stylus, or other electronic equipment. Illustrative configurations in which device 12 is a tablet computer or similar electronic device and in which device 10 is an electronic accessory that couples with the tablet computer or similar electronic device during wireless power transfer operations may sometimes be described herein as examples. For example, in one embodiment electronic device 10 is a tablet computer and electronic device 12 is a stylus configured to attach to electronic device 10 (tablet) and be wirelessly (e.g., inductively) charged by electronic device 10 (tablet). Illustrative configurations in which device 12 is a mat or other equipment that forms a wireless charging surface and in which device 10 is a portable electronic device or electronic accessory that rests on the wireless charging surface during wireless power transfer operations may also sometimes be described herein as examples.

During operation of system 8, a user places one or more devices 10 on or near the charging region of device 12. Power transmitting device 12 is coupled to a source of alternating-current voltage such as alternating-current power source 50 (e.g., a wall outlet that supplies line power or other source of mains electricity), has a battery such as battery 38 for supplying power, and/or is coupled to another source of power. A power converter such as AC-DC power converter 40 can be included to convert power from a mains power source or other AC power source into DC power that is used to power control circuitry 42 and other circuitry in device 12. During operation, control circuitry 42 uses wireless power transmitting circuitry 34 and one or more coils 36 coupled to circuitry 34 to generate an alternating magnetic field and to transmit alternating-current wireless power signals 48 to device 10 and thereby convey wireless power to wireless power receiving circuitry 46 of device 10.

Power transmitting circuitry 34 has switching circuitry (e.g., transistors in an inverter circuit) that are turned on and off based on control signals provided by control circuitry 42 to create AC current signals through appropriate coils 36. As the AC currents pass through a coil 36 that is being driven by the switching circuitry, a time-varying magnetic field (wireless power signals 48) or "flux" is generated, that is received by one or more corresponding coils 14 electrically connected to wireless power receiving circuitry 46 in electronic device 10. If the time-varying magnetic field is magnetically coupled to coil 14, an AC voltage is induced and a corresponding AC currents flows in coil 14. Rectifier circuitry in power receiving circuitry 46 can convert the induced AC voltage in the one or more coils 14 into a DC voltage signals for powering device 10. The DC voltages are used in powering components in device 10 such as display 52, touch sensor components and other sensors 54 (e.g., accelerometers, force sensors, temperature sensors, light sensors, pressure sensors, gas sensors, moisture sensors, magnetic sensors, etc.), wireless communications circuitry 56 for communicating wirelessly with control circuitry 42 of device 12 and/or other equipment, audio components, and other components (e.g., input-output devices 22 and/or control circuitry 20) and/or are used in charging an internal battery in device 10 such as battery 18, or to charge subsequent devices, either wired or wirelessly.

Devices 12 and 10 include control circuitry 42 and 20. Control circuitry 42 and 20 may include storage and processing circuitry such as analog circuitry, microprocessors, power management units, baseband processors, digital signal processors, field-programmable gate arrays, microcontrollers, application-specific integrated circuits with processing circuits and/or any combination thereof. Control circuitry 42 and 20 is configured to execute instructions for implementing desired control and communications features in system 8. For example, control circuitry 42 and/or 20 may be used in sensing for foreign or other non-receiver objects (e.g.: metallic objects such as coins or RFID tags within electronic devices), determining power transmission levels, processing sensor data, processing user input, processing other information such as information on wireless coupling efficiency from power transmitting circuitry 34, processing information from power receiving circuitry 46, using information from power transmitting circuitry 34 and/or 46 such as signal measurements on output circuitry in circuitry 34 and other information from circuitry 34 and/or 46 to determine when to start and stop wireless charging operations, adjusting charging parameters such as charging frequencies, coil assignments in a multi-coil array, and wireless power transmission levels, and performing other control functions.

In particular, the control circuitry may perform analyses based on parameters derived from a loss-split model of the transmitter and/or receiver device as described above. Control circuitry 42 and/or 20 may be configured to perform these operations using hardware (e.g., dedicated hardware or circuitry) and/or software (e.g., code that runs on the hardware of system 8). Software code for performing these operations is stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 42 and/or 20. The processing circuitry may include application-specific integrated circuits with processing circuitry, one or more microprocessors, or other processing circuitry.

Device 12 and/or device 10 may communicate wirelessly. Devices 10 and 12 may, for example, have wireless transceiver circuitry in control circuitry 42 and 20 (and/or wireless communications circuitry such as wireless communication circuitry 56 of FIG. 8) that allows wireless transmission of signals between devices 10 and 12 (e.g., using antennas that are separate from coils 36 and 14 to transmit and receive unidirectional or bidirectional wireless signals, using coils 36 and 14 to transmit and receive unidirectional or bidirectional wireless signals, etc.). For example, device 12 and/or device 10 may communicate using in-band communications injected or combined into the wireless power signals 48 such as proposed in the Wireless Power Consortium Qi specification 1.2.3, which is incorporated herein by reference. Alternatively, a separate Bluetooth, RFID, NFC, Zigbee, WiFi, RF or other communication system may be employed.

The above-discussed loss-split-model-based analyses of wireless power transfer systems may be advantageously employed in a variety of applications relating to wireless power transfer systems. For example, the above described techniques and systems can be used to provide:

(1) Methods and systems for extracting a circuit that accurately models the two-port behavior of the wireless power link (i.e., a loss-split model) over a wide range of operating points and separates the losses into physical regions relating to the TX coil, metal in the TX housing, the RX coil, metal in the RX housing, and any foreign objects present.

Additionally, the above described techniques and systems can be used to provide:

(2) Methods and systems that use the methods and systems of (1) to iterate the physical design of a wireless power transmitter (TX) to minimize the losses in the TX housing, thereby improving operating efficiency.

Additionally, the above described techniques and systems can be used to provide:

(3) Methods and systems that use the methods and systems of (1) to iterate the physical design of a wireless power receiver (RX) to minimize the losses in the RX housing, thereby improving efficiency (by reducing power loss). Additionally, for applications relating to battery charging in portable devices, the reduced losses in the RX housing can improve battery charge times and/or longevity by reducing heat generated near the battery.

Additionally, the above described techniques and systems can be used to provide:

(4) Methods and systems that use the methods and systems of (1) to iterate the physical design of a wireless power receiver so as to minimize the effect of physical operating point (i.e., relative positioning of transmitter and receiver) on RX housing losses. This may provide the further advantage of simplifying coefficient extraction for the power loss equations and improving the accuracy of that power loss equation when mated with an arbitrary TX.

Additionally, the above described techniques and systems can be used to provide:

(5) Methods and systems that use (1) to iterate the physical design of a wireless power transmitter so as to minimize the effect of physical operating point (i.e., relative positioning of transmitter and receiver) on TX housing losses. This may provide the further advantage of simplifying coefficient extraction for the power loss equations and improving the accuracy of that power loss equation when mated with an arbitrary RX.

Additionally, the above described techniques and systems can be used to provide:

(6) Methods and systems that use (1) to quickly validate the effects of reliability, temperature drift, or unit-to-unit variation on the fit parameters used to estimate power loss in a wireless power link Additionally, the above described techniques and systems can be used to provide:

(7) Methods and systems that use (1) and (6) to generate data that covers the entire space of physical and electrical operating points, which data can be used to promote performance of a foreign object detection subsystem across the same space.

Additionally, the above described techniques and systems can be used to provide:

(8) Methods and systems that use (1) to select an operating point at which a foreign object is maximally visible to the wireless power system. For example, the above techniques and systems may sweep the space of electrical operating points to determine an electrical operating point at which a the calculated power dissipation in the foreign object is maximized (and thus easiest to detect). A foreign object detection system based on this analysis could operate an implemented wireless power transfer system to move to that electrical operating point to confirm the presence or absence of a foreign object.

Additionally, the above described techniques and systems can be used to provide:

(9) Methods and systems that use (1) to model higher harmonic content and uses such higher harmonic content models in any of (2)-(8). In some cases, the finite element analyses implemented above may be single-frequency, and thus may ignore model electrical components at other frequencies. However, the loss-split circuit model may be recomputed at any frequency, and thus extended to improve the accuracy of the model. This can lead to a power-accounting system with improved robustness.

Additionally, the above described techniques and systems can be used to provide:

(10) Any power-loss estimation equation that is a function of the measured phase difference between TX current and RX current. As discussed above, the results of the loss-split analysis may be used to build a regression model, look-up table, or other arrangement for use in the design, implementation, or operation of a wireless power transfer system. In some embodiments, it may be advantageous to incorporate phase difference between the transmitter side voltages and currents and the receiver side voltages and currents to generate a more robust power-accounting system.

Described above are various features, embodiments, and applications relating to wireless power transfer systems, and particularly wireless power transfer systems having loss-split models constructed and applied as described herein. These arrangements may be particularly advantageous when used in conjunction with optimizing the design of wireless power transfer components as described above and/or in the detection and mitigation of foreign objects introduced during operation of the wireless power transfer components. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A wireless power transmitter comprising:
one or more transmitter coils;
wireless power transmitting circuitry configured to drive the one or more transmitter coils with energy derived from a power source; and
control circuitry configured to control the wireless power transmitting circuitry, wherein the control circuitry implements foreign object detection algorithms derived from a loss-split circuit model that includes a plurality of resistance values corresponding to power losses in selected components of the power system and derived by performing a plurality of finite element analyses of at least the wireless power transmitter;
wherein the plurality of finite element analyses include:
a first finite element analysis in which the transmitter current has a predetermined value and the receiver current is fixed at zero;
a second finite element analysis in which the transmitter current is fixed at zero and the receiver current has a predetermined value; and
a third finite element analysis in which the transmitter and receiver current are equal and in phase.

2. The wireless power transmitter of claim 1 wherein the plurality of resistance values includes one or more resistance values associated with one or more items selected from the group consisting of:
a transmitter coil;
a receiver coil;
friendly metal associated with a transmitter;
friendly metal associated with a receiver; and
a foreign object.

3. The wireless power transmitter of claim 2 wherein the friendly metal associated with a transmitter includes metal in the transmitter housing.

4. The wireless power transmitter of claim 2 wherein the friendly metal associated with a receiver includes metal in the receiver housing.

5. The wireless power transmitter of claim 2 wherein the first finite element analysis produces one or more equations relating the predetermined transmitter current, the plurality of resistance values, and power loss in the one or more items selected from the group consisting of: a transmitter coil, a receiver coil, friendly metal associated with a transmitter, friendly metal associated with a receiver, and a foreign object.

6. The wireless power transmitter of claim 5 wherein the one or more equations relating the predetermined transmitter current, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{TX\text{-}coil\text{-}case1} = I_{TX}^2 \cdot R_{TX\text{-}coil}$, where $P_{TX\text{-}coil\text{-}case1}$ is power loss in the transmitter coil, $I_{TX}$ is the predetermined transmitter current, and $R_{TX\text{-}coil}$ is a resistance value associated with the transmitter coil;

$P_{FM_{TX}\text{-}case1} = I_{TX}^2 \cdot (R_{TX\text{-}FM_{TX}} + R_{M\text{-}FM_{TX}})$, where $P_{FM_{TX}\text{-}case1}$ is power loss in the friendly metal associated with the transmitter, $I_{TX}$ is the predetermined transmitter current, and $R_{TX\text{-}FM_{TX}}$ and $R_{M\text{-}FM_{TX}}$ are resistance values associated with the friendly metal associated with the transmitter;

$P_{FM_{RX}\text{-}case1} = I_{TX}^2 \cdot (R_{TX\text{-}FM_{RX}} + R_{M\text{-}FM_{RX}})$, where $P_{FM_{RX}\text{-}case1}$ is power loss in the friendly metal associated with the receiver, $I_{TX}$ is the predetermined transmitter current, and $R_{TX\text{-}FM_{RX}}$ and $R_{M\text{-}FM_{RX}}$ are resistance values associated with the friendly metal associated with the receiver; and $P_{FO\text{-}case1} = I_{TX}^2 \cdot (R_{TX\text{-}FO} + R_{M\text{-}FO})$, where $P_{FO\text{-}case1}$ is power loss in the foreign object, $I_{TX}$ is the predetermined transmitter current, and $R_{TX\text{-}FO}$ and $R_{M\text{-}FO}$ are resistance values associated with the foreign object.

7. The wireless power transmitter of claim 2 wherein the second finite element analysis produces one or more equations relating the predetermined receiver current, the plurality of resistance values, and power loss in the one or more items selected from the group consisting of: a transmitter coil, a receiver coil, friendly metal associated with a transmitter, friendly metal associated with a receiver, and a foreign object.

8. The wireless power transmitter of claim 7 wherein the one or more equations relating the predetermined receiver current, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{RX\text{-}coil\text{-}case2} = I_{RX}^2 \cdot R_{RX\text{-}coil}$, where $P_{RX\text{-}coil\text{-}case2}$ is power loss in the receiver coil, $I_{RX}$ is the predetermined receiver current, and $R_{RX\text{-}coil}$ is a resistance value associated with the receiver coil;

$P_{FMTX\text{-}case2} = I_{RX}^2 \cdot (R_{RX\text{-}FM_{TX}} + R_{M\text{-}FM_{TX}})$, where $P_{FM_{TX}\text{-}case2}$ is power loss in the friendly metal associated with the transmitter, $I_{RX}$ is the predetermined receiver current, and $R_{RX\text{-}FM_{TX}}$ and $R_{M\text{-}FM_{TX}}$ are resistance values associated with the friendly metal associated with the transmitter;

$P_{FM_{RX}\text{-}case2} = I_{RX}^2 \cdot (R_{RX\text{-}FM_{RX}} + R_{M\text{-}FM_{RX}})$, where $P_{FM_{RX}\text{-}case2}$ is power loss in the friendly metal associated with the receiver, $I_{RX}$ is the predetermined receiver current, and $R_{RX-FM_{RX}}$ and $R_{M-FMRX}$ are resistance values associated with the friendly metal associated with the receiver; and $P_{FO-case2} = I_{RX}^2 \cdot (R_{RX-FO} + R_{M-FO})$, where $P_{FO-CASE2}$ is power loss in the foreign object, $I_{RX}$ is the predetermined transmitter current, and $R_{RX-FO}$ and $R_{M-FO}$ are resistance values associated with the foreign object.

9. The wireless power transmitter of claim 2 wherein the third finite element analysis produces one or more equations relating the equal and in phase transmitter and receiver currents, the plurality of resistance values, and power loss in the one or more items selected from the group consisting of: a transmitter coil, a receiver coil, friendly metal associated with a transmitter, friendly metal associated with a receiver, and a foreign object.

10. The wireless power transmitter of claim 9 wherein the one or more equations relating the equal and in phase transmitter and receiver currents, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{FM_{TX}-case3} = I_{TX}^2 \cdot R_{TX-FM_{TX}} + I_{RX}^2 \cdot R_{RX-FM_{TX}} + (I_{TX}+I_{RX})^2 \cdot R_{M-FM_{TX}}$, where $P_{FM_{TX}-case3}$ is power loss in the friendly metal associated with the transmitter, $I_{TX}$ is the transmitter current, $I_{RX}$ is the receiver current, and $R_{TX-FM_{TX}}$, $R_{RX-FM_{TX}}$, and $R_{M-FM_{TX}}$ are resistance values associated with the friendly metal associated with the transmitter;

$P_{FMRX-case3} = I_{TX}^2 \cdot R_{TX-FM_{RX}} + I_{RX}^2 \cdot R_{RX-FM_{RX}} + (I_{TX}+I_{RX})^2 \cdot R_{M-FM_{RX}}$, where $P_{FM_{RX}-case3}$ is power loss in the friendly metal associated with the receiver, $I_{TX}$ is the transmitter current, $I_{RX}$ is the receiver current, and $R_{TX-FM_{RX}}$, $R_{RX-FM_{RX}}$, and $R_{M-FM_{RX}}$ are resistance values associated with the friendly metal associated with the receiver; and $P_{FM_{FO}-case3} = I_{TX}^2 \cdot R_{TX-FO} + I_{RX}^2 \cdot R_{RX-FO} + (I_{TX}+I_{RX})^2 \cdot R_{M-FO}$, where $P_{FM_{FO}-case3}$ is power loss in the foreign object, $I_{TX}$ is the transmitter current, $I_{RX}$ is the receiver current, and $R_{TX-FO}$, $R_{RX-FO}$, and $R_{M-FO}$ are resistance values associated with the foreign object.

11. The wireless power transmitter of claim 1 wherein the plurality of finite element analyses are performed at a plurality of frequencies.

12. The wireless power transmitter of claim 1 wherein the plurality of finite element analyses include model variations that account for tolerances associated with one or more of: unit-to-unit variation, lifetime drift, and temperature effects.

13. A wireless power receiver comprising:
one or more receiver coils;
wireless power receiving circuitry configured recover power from the one or more receiver coils; and
control circuitry configured to control the wireless power receiver circuitry, wherein the control circuitry implements foreign object detection algorithms derived from a loss-split circuit model that includes a plurality of resistance values corresponding to power losses in selected components of the power system and derived by performing a plurality of finite element analyses of at least the wireless power receiver;
wherein the plurality of finite element analyses include:
a first finite element analysis in which the transmitter current has a predetermined value and the receiver current is fixed at zero;
a second finite element analysis in which the transmitter current is fixed at zero and the receiver current has a predetermined value; and
a third finite element analysis in which the transmitter and receiver current are equal and in phase.

14. The wireless power receiver of claim 13 wherein the plurality of resistance values includes one or more resistance values associated with one or more items selected from the group consisting of:
a transmitter coil;
a receiver coil;
friendly metal associated with a transmitter;
friendly metal associated with a receiver; and
a foreign object.

15. The wireless power receiver of claim 14 wherein the friendly metal associated with a transmitter includes metal in the transmitter housing.

16. The wireless power receiver of claim 14 wherein the friendly metal associated with a receiver includes metal in the receiver housing.

17. The wireless power receiver of claim 14 wherein the first finite element analysis produces one or more equations relating the predetermined transmitter current, the plurality of resistance values, and power loss in the one or more items selected from the group consisting of: a transmitter coil, a receiver coil, friendly metal associated with a transmitter, friendly metal associated with a receiver, and a foreign object.

18. The wireless power receiver of claim 17 wherein the one or more equations relating the predetermined transmitter current, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{TX-coil-case1} = I_{TX}^2 \cdot R_{TX-coil}$, where $P_{TX-coil-case1}$ is power loss in the transmitter coil, $I_{TX}$ is the predetermined transmitter current, and $R_{TX-coil}$ is a resistance value associated with the transmitter coil;

$P_{FM_{TX}-case1} = I_{TX}^2 \cdot (R_{TX-FM_{TX}} + R_{M-FM_{TX}})$, where $P_{FM_{TX}-case1}$ is power loss in the friendly metal associated with the transmitter, $I_{TX}$ is the predetermined transmitter current, and $R_{TX-FM_{TX}}$ and $R_{M-FM_{TX}}$ are resistance values associated with the friendly metal associated with the transmitter;

$P_{FM_{RX}-case1} = I_{TX}^2 \cdot (R_{TX-FM_{RX}} + R_{M-FM_{RX}})$, where $P_{FM_{RX}-case1}$ is power loss in the friendly metal associated with the receiver, $I_{TX}$ is the predetermined transmitter current, and $R_{TX-FM_{RX}}$ and $R_{M-FM_{RX}}$ are resistance values associated with the friendly metal associated with the receiver; and $P_{FO-case1} = I_{TX}^2 \cdot (R_{TX-FO} + R_{M-FO})$, where $P_{FO-case1}$ is power loss in the foreign object, $I_{TX}$ is the predetermined transmitter current, and $R_{TX-FO}$ and $R_{M-FO}$ are resistance values associated with the foreign object.

19. The wireless power receiver of claim 14 wherein the second finite element analysis produces one or more equations relating the predetermined receiver current, the plurality of resistance values, and power loss in the one or more items selected from the group consisting of: a transmitter coil, a receiver coil, friendly metal associated with a transmitter, friendly metal associated with a receiver, and a foreign object.

20. The wireless power receiver of claim 19 wherein the one or more equations relating the predetermined receiver current, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{RX\text{-}coil\text{-}case2} = I_{RX}^2 \cdot R_{RX\text{-}coil}$, where $P_{RX\text{-}coil\text{-}case2}$ is power loss in the receiver coil, $I_{RX}$ is the predetermined receiver current, and $R_{RX\text{-}coil}$ is a resistance value associated with the receiver coil;

$P_{FM_{TX}\text{-}case2} = I_{RX}^2 \cdot (R_{RX\text{-}FM_{TX}} + R_{M\text{-}FM_{TX}})$, where $P_{FM_{TX}\text{-}case2}$ is power loss in the friendly metal associated with the transmitter, $I_{RX}$ is the predetermined receiver current, and $R_{RX\text{-}FM_{TX}}$ and $R_{M\text{-}FM_{TX}}$ are resistance values associated with the friendly metal associated with the transmitter;

$P_{FM_{RX}\text{-}case2} = I_{RX}^2 \cdot (R_{RX\text{-}FM_{RX}} + R_{M\text{-}FM_{RX}})$, where $P_{FM_{RX}\text{-}case2}$ is power loss in the friendly metal associated with the receiver, $I_{RX}$ is the predetermined receiver current, and $R_{RX\text{-}FM_{RX}}$ and $R_{M\text{-}FM_{RX}}$ are resistance values associated with the friendly metal associated with the receiver; and $P_{FO\text{-}case2} = I_{RX}^2 \cdot (R_{RX\text{-}FO} + R_{M\text{-}FO})$, where $P_{FO\text{-}case2}$ is power loss in the foreign object, $I_{RX}$ is the predetermined transmitter current, and $R_{RX\text{-}FO}$ and $R_{M\text{-}FO}$ are resistance values associated with the foreign object.

21. The wireless power receiver of claim 14 wherein the third finite element analysis produces one or more equations relating the equal and in phase transmitter and receiver currents, the plurality of resistance values, and power loss in the one or more items selected from the group consisting of: a transmitter coil, a receiver coil, friendly metal associated with a transmitter, friendly metal associated with a receiver, and a foreign object.

22. The wireless power receiver of claim 20 wherein the one or more equations relating the equal and in phase transmitter and receiver currents, the plurality of resistance values, and power loss in the one or more items selected from the group consisting of: a transmitter coil, a receiver coil, friendly metal associated with a transmitter, friendly metal associated with a receiver, and a foreign object include one or more equations having a form selected from the group consisting of:

$P_{FM_{TX}\text{-}case3} = I_{TX}^2 \cdot R_{TX\text{-}FM_{TX}} + I_{RX}^2 \cdot R_{RX\text{-}FM_{TX}} + (I_{TX} + I_{RX})^2 \cdot R_{M\text{-}FM_{TX}}$, where $P_{FM_{TX}\text{-}case3}$ is power loss in the friendly metal associated with the transmitter, $I_{TX}$ is the transmitter current, $I_{RX}$ is the receiver current, and $R_{TX\text{-}FM_{TX}}$, $R_{RX\text{-}FM_{TX}}$, and $R_{M\text{-}FM_{TX}}$ are resistance values associated with the friendly metal associated with the transmitter;

$P_{FM_{RX}\text{-}case3} = I_{TX}^2 \cdot R_{TX\text{-}FM_{RX}} + I_{RX}^2 \cdot R_{RX\text{-}FM_{RX}} + (I_{TX} + I_{RX})^2 \cdot R_{M\text{-}FM_{RX}}$, where $P_{FM_{RX}\text{-}case3}$ is power loss in the friendly metal associated with the receiver, $I_{TX}$ is the transmitter current, $I_{RX}$ is the receiver current, and $R_{TX\text{-}FM_{RX}}$, $R_{RX\text{-}FM_{RX}}$, and $R_{M\text{-}FM_{RX}}$ are resistance values associated with the friendly metal associated with the receiver; and $P_{FM_{FO}\text{-}case3} = I_{TX}^2 \cdot R_{TX\text{-}FO} + I_{RX}^2 \cdot R_{RX\text{-}FO} + (I_{TX} + I_{RX})^2 \cdot R_{M\text{-}FO}$, where $P_{FM_{FO}\text{-}case3}$ is power loss in the foreign object, $I_{TX}$ is the transmitter current, $I_{RX}$ is the receiver current, and $R_{TX\text{-}FO}$, $R_{RX\text{-}FO}$, and $R_{M\text{-}FO}$ are resistance values associated with the foreign object.

23. The wireless power receiver of claim 13 wherein the plurality of finite element analyses are performed at a plurality of frequencies.

24. The wireless power receiver of claim 13 wherein the plurality of finite element analyses include model variations that account for tolerances associated with one or more of: unit-to-unit variation, lifetime drift, and temperature effects.

* * * * *